July 2, 1940.   H. FALK   2,206,174
CLOTHESLINE HOLDER
Filed Oct. 26, 1938
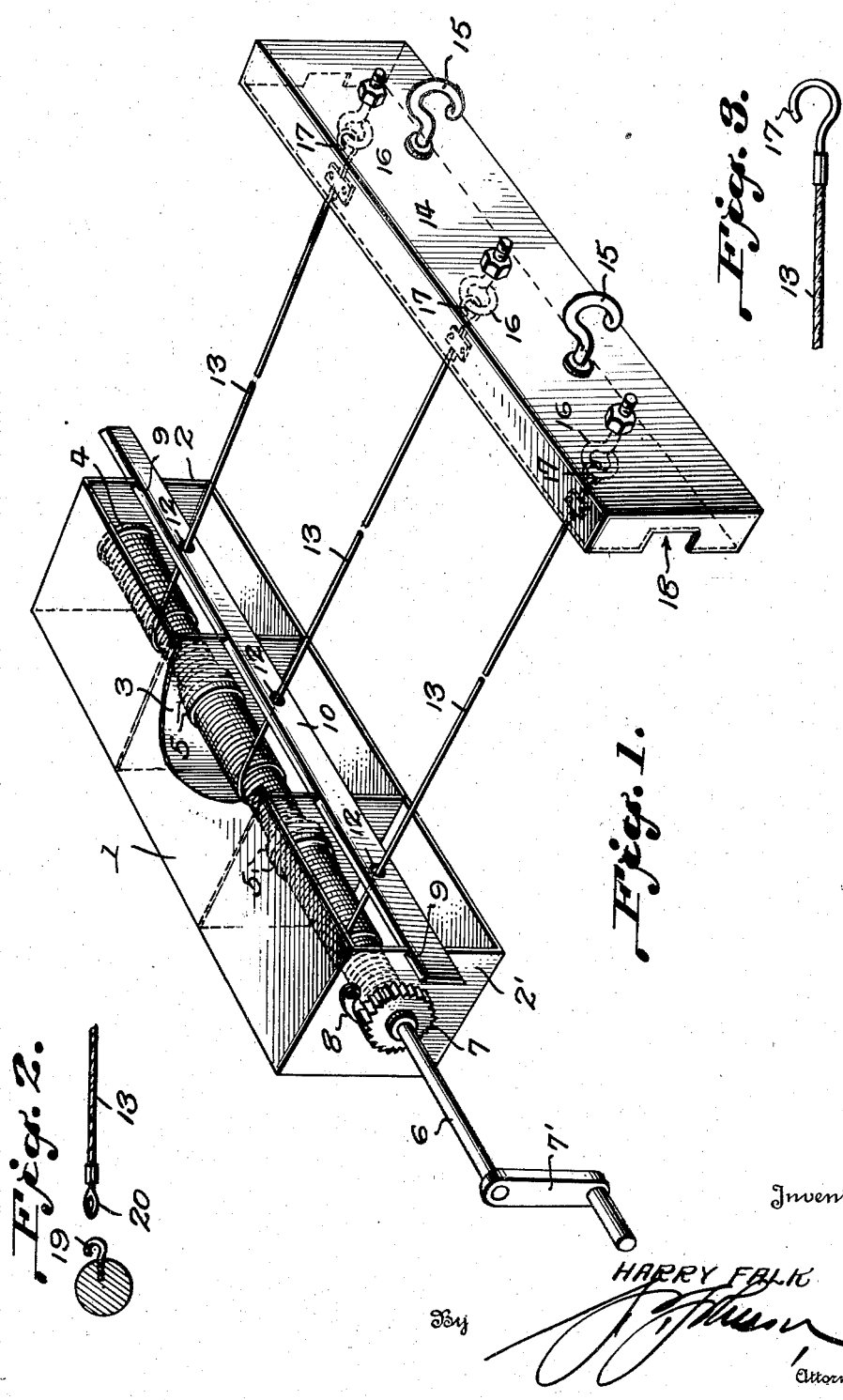
Inventor
HARRY FALK
By
Attorney Patented July 2, 1940

2,206,174

UNITED STATES PATENT OFFICE 2,206,174

CLOTHESLINE HOLDER

Harry Falk, Silver Spring, Md.

Application October 26, 1938, Serial No. 237,155

1 Claim. (Cl. 211—119.10)

This invention relates to a clothesline holder.

One object is to provide an outdoor holder by which the line is protected from the weather and at the same time be conveniently available for use.

Another object is to provide a device of this kind in which the cooperating parts of the winding mechanisms are so related as to insure the level winding of the line when it is withdrawn into the housing.

A still further object is to provide a simple and durable contrivance, the cost and selling price of which will not be prohibitive, but commensurate with the ends accomplished.

Another object is to so shape the housing and the line attaching bar, which is used in connection with the holder, that they can be conveniently attached to such supports as are usually available in such places as are used for clothes drying.

In the drawing illustrating the invention:

Figure 1 is a perspective view of the holder and the line attaching bar, with a portion of the line played out, and the bar separated from the holder proper.

Figure 2 is a detail section of the winding shaft showing the starting hook secured thereto, and the ring end of the line.

Figure 3 is a detail fragmentary view of the opposite end or hook end of the line, showing the hook for convenient attachment to the eyes carried by the line attaching bar.

Referring to the drawing, the holder or housing comprises in the main, an elongated rectangular body 1 divided into three open front compartments by the ends 2 and 2' and interior partitions 3, there being bearings 4 in the ends of the body, and bearings 5 in the partitions for winding shaft 6 that extends for the full length of the housing.

On the end of the shaft, on the outside of the housing, is a ratchet 7 cooperating with a pawl 8, pivoted adjacent the ratchet for the usual purposes of preventing retrograde movement of the ratchet and the shaft to which it is fixed, when the line is being made taut after its having been secured to the line attaching bar, and when it is being wound into the housing after use. The shaft 6 carries crank 7'.

There are dovetail recesses 9 in the ends of the housing and in the partitions in which there is a shuttle bar 10 whose cross section corresponds in shape to the dovetail recesses, the arrangement being such that while the shuttle bar can be moved laterally in both directions, it is held to the housing. Apertures 12 are provided in the bar for the passage of clotheslines 13. This bar is capable of a reciprocating or slow shuttle-like movement imparted to it by the winding of the line on to the shaft.

An important feature of the invention is the line attaching bar 14 which, when drawn against the front of the housing, forms a tight closure therefor, protecting all parts of the device which are in the housing from the weather, smoke, dust, etc. The outer face of this bar is preferably provided with two downwardly turned hooks 15 by which it may be conveniently secured to the suitable eyes on a suitable support. The bar is further provided on the opposite side from the housing 13 with eyes 16, corresponding in number to the number of lines that may be in the housing. These eyes are engaged by hooks 17 which are preferably secured to the outer ends of the lines or ropes. The inner face of the bar 14 is grooved or recessed as indicated at 18 to receive the shuttle bar when the housing and attaching bar are brought together, for protection against weather, when the holder is used out of doors or for storing, shipping, etc. This bar will be of such thickness and the groove 18 will be of such depth as to permit the provision of the eyes 16 within it and still permit the bar to closely embrace the shuttle bar 10. The shaft 6, wherever there is to be a winding of the line or rope is provided with a small hook 19 to receive the eye 20 of the line for the winding start.

In operation, the line is attached to the hook, and the crank 7 is turned, winding the line upon the shaft. The coil in the line of such winding will lie side by side progressing toward the partitions 3 in the case of the first two coils and toward the end 2 of the holder in the case of the last coil, and as the line is wound upon the shaft, it moves the shuttle laterally. When the winding stops, by reason of the line coming in contact with the partitions and with the end of the holder, the winding naturally starts in the opposite direction and this movement continues back and forth until all of the rope or line is wound into the housing. The shuttle bar serves the purpose of assuring the even winding of the line upon the shaft, and necessarily, since the apertures 12 in the bar are equally spaced, the lines passing through them will be separated a corresponding distance and always maintained in the same spaced relation to each other.

I have illustrated the housing with three compartments to accommodate three clotheslines, but it is to be understood that the number of compartments and lines may be varied within practical limits.

The line attaching bar 14 is made of the same length and width of the body proper of the housing so, as intimated, it will serve as a complete closure for the front of the compartments when the housing and bar are brought together.

I claim:

A device of the class described comprising a housing having an open side, a shaft journaled in the housing, a line having one terminal fixed to the shaft, a line attaching bar connected with the outer terminal of the line, said bar being provided with means for attachment to a support remote from the housing whereby said bar serves when remote from the housing to support the line in operative position, said bar being of size and shape to abut the open side of the housing and serve as a closure for the open side thereof when tension is applied to the line by winding same upon the shaft and upon detachment of said attaching means from said support.

HARRY FALK.